(12) United States Patent
Alecu et al.

(10) Patent No.: US 11,921,525 B1
(45) Date of Patent: Mar. 5, 2024

(54) SYSTEM AND METHOD FOR CONTROLLING FLUID FLOW WITH A PRESSURE RELIEF VALVE

(71) Applicant: Pratt & Whitney Canada Corp., Longueuil (CA)

(72) Inventors: Daniel Alecu, Brampton (CA); Laslo T. Diosady, Etobicoke (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/994,211

(22) Filed: Nov. 25, 2022

(51) Int. Cl.
| | | |
|---|---|---|
| *G05D 16/20* | (2006.01) | |
| *F15C 3/00* | (2006.01) | |
| *G05B 19/46* | (2006.01) | |
| *G05D 7/06* | (2006.01) | |
| *G05D 16/08* | (2006.01) | |

(52) U.S. Cl.
CPC ............ *G05D 16/2013* (2013.01); *F15C 3/00* (2013.01); *G05B 19/46* (2013.01); *G05D 7/0641* (2013.01); *G05D 7/0647* (2013.01); *G05D 7/0688* (2013.01); *G05D 16/08* (2013.01); *G05D 16/2022* (2019.01); *G05D 16/2066* (2013.01)

(58) Field of Classification Search
CPC ........... G05D 16/2013; G05D 16/2022; G05D 16/2066; G05D 16/08; G05D 7/0688; G05D 7/0641; G05D 7/0647; G05B 19/46; F15C 3/00
USPC ...... 137/12, 115.13, 115.14, 115.18, 115.22, 137/565.13, 565.15, 147
See application file for complete search history.

(56) References Cited

U.S. PATENT DOCUMENTS

| 703,220 | A | * | 6/1902 | White | F04B 49/24 |
| | | | | | 137/115.18 |
| 3,029,636 | A | * | 4/1962 | Mullins, Jr. | B64D 45/00 |
| | | | | | 73/178 R |
| 3,455,319 | A | * | 7/1969 | Hogel | F15C 3/00 |
| | | | | | 137/596.18 |
| 3,946,562 | A | * | 3/1976 | Ross | F15B 21/047 |
| | | | | | 137/115.11 |
| 4,343,324 | A | * | 8/1982 | Ohe | G05D 7/0126 |
| | | | | | 137/504 |

(Continued)

FOREIGN PATENT DOCUMENTS

| JP | 2013228101 A | 11/2013 |
| JP | 2015218757 A | 12/2015 |

*Primary Examiner* — Minh Q Le
(74) *Attorney, Agent, or Firm* — Getz Balich LLC

(57) ABSTRACT

A fluid supply system and method is provided that includes a fluid pump, a pressure sensor, a pressure relief valve (PRV), and a fluid monitoring device. The fluid pump receives fluid from a first conduit and discharges fluid into a second conduit. The pressure sensor produces sensed fluid pressure signals. The PRV is in signal communication with the pressure sensor. The fluid monitoring device includes a control orifice in fluid communication with second and third conduits. The second conduit has a first inner diameter, the third conduit has a second inner diameter, and the control orifice has an orifice inner diameter, and the orifice inner diameter is less than the first and second inner diameters. The pressure sensor senses fluid pressure in the third conduit at a position in close proximity to the control orifice. The fluid monitoring device may be in a lead or a lag domain configuration.

20 Claims, 5 Drawing Sheets

(56) References Cited

U.S. PATENT DOCUMENTS

| | | | | |
|---|---|---|---|---|
| 4,609,330 | A * | 9/1986 | Fahey | F15B 11/17 |
| | | | | 417/288 |
| 4,930,992 | A * | 6/1990 | Takeuchi | G05D 16/2066 |
| | | | | 60/329 |
| 5,182,704 | A * | 1/1993 | Bengtsson | G05D 16/2013 |
| | | | | 239/69 |
| 5,787,926 | A | 8/1998 | Mukumoto | |
| 6,170,508 | B1 * | 1/2001 | Faust | G05D 7/0126 |
| | | | | 137/12 |
| 6,328,056 | B1 | 12/2001 | Kumar | |
| 6,474,064 | B1 | 11/2002 | Heyne | |
| 6,647,721 | B2 | 11/2003 | Heyne | |
| 7,740,024 | B2 * | 6/2010 | Brodeur | G01F 1/363 |
| | | | | 700/282 |
| 8,485,212 | B2 * | 7/2013 | Willeke | F16H 61/66272 |
| | | | | 137/115.26 |
| 2002/0100505 | A1 * | 8/2002 | Keilty | G01F 1/74 |
| | | | | 137/487.5 |
| 2006/0174950 | A1 * | 8/2006 | Muller | F16D 48/02 |
| | | | | 137/565.13 |
| 2007/0157969 | A1 * | 7/2007 | Gross | F17C 7/00 |
| | | | | 137/2 |
| 2016/0195083 | A1 * | 7/2016 | Lingenfelter | F04B 49/08 |
| | | | | 137/565.13 |

* cited by examiner

SYSTEM AND METHOD FOR CONTROLLING FLUID FLOW WITH A PRESSURE RELIEF VALVE

BACKGROUND OF THE INVENTION

1. Technical Field

The present disclosure relates to fluid flow systems with pressure relief valves in general, and to fluid flow systems configured to control pressure relief valve operation in particular.

2. Background Information

Fluid supply systems often include a fluid pump and a pressure relief valve (PRV) connected across the fluid pump and one or more components downstream of the fluid pump. A PRV pressure sensor is disposed to sense the fluid pressure upstream of the heat exchanger may be used to provide signal information to the PRV that can be used in the control of the PRV. The PRV and PRV pressure sensor are intended to facilitate maintaining fluid flow rate in a steady state mode. In a steady state mode, the fluid pump delivers exactly the amount of fluid required by the downstream components. Pressure oscillations are a common occurrence in such a system and may have multiple causes. In some cases, pressure oscillations may be caused by the PRV "hunting" and can reach destructive levels. Small changes in pump speed that increase the inlet fluid flow rate into downstream components may shift the system from a steady state mode to a non-steady state mode.

What is needed is a system, system components, and/or method that improve the ability of a fluid supply system to address changes in fluid flow rate and thereby facilitate system operation in a steady state mode.

SUMMARY

According to an aspect of the present disclosure, a fluid supply system is provided that includes a fluid pump, a pressure sensor, a pressure relief valve (PRV), and a fluid monitoring device. The fluid pump is configured to receive a fluid from a first conduit disposed upstream of the fluid pump and to discharge fluid into a second conduit downstream of the fluid pump. The pressure sensor is configured to produce signals representative of a sensed fluid pressure. The PRV has an inlet and an outlet and a fluid passage therethrough. The PRV is controllable to be in a closed configuration, or a fully open configuration, or a plurality of partially open configurations, and the PRV is in signal communication with the pressure sensor. The fluid monitoring device has a control orifice in fluid communication with the second conduit disposed upstream of the control orifice and a third conduit disposed downstream of the control orifice. The second conduit has a first inner diameter, the third conduit has a second inner diameter, and the control orifice has an orifice inner diameter, and the orifice inner diameter is less than both the first inner diameter and the second inner diameter. The pressure sensor is disposed to sense fluid pressure in the third conduit at a position downstream of the control orifice in close proximity to the control orifice.

In any of the aspects or embodiments described above and herein, the control orifice inner diameter may be no greater than half the first inner diameter.

In any of the aspects or embodiments described above and herein, the second inner diameter may be at least twice the control orifice inner diameter.

In any of the aspects or embodiments described above and herein, the control orifice has an axial length, and may have an axial length over control orifice inner diameter ratio that is less than one.

In any of the aspects or embodiments described above and herein, the control orifice has an axial length, and may have an axial length over control orifice inner diameter ratio that is at least two.

According to an aspect of the present disclosure, a fluid supply system is provided that includes a fluid pump, a pressure sensor, a pressure relief valve (PRV), and a fluid monitoring device. The fluid pump is configured to receive a fluid from a first conduit disposed upstream of the fluid pump and to discharge fluid into a second conduit downstream of the fluid pump. The pressure sensor is configured to produce signals representative of a sensed fluid pressure. The pressure relief valve (PRV) has an inlet and an outlet and a fluid passage therethrough. The PRV is controllable to be in a closed configuration, or a fully open configuration, or a plurality of partially open configurations, and the PRV is in signal communication with the pressure sensor. The fluid monitoring device has an upstream orifice (UO) in fluid communication with the second conduit, a downstream orifice (DO) in fluid communication with a third conduit, and a sensing chamber (SC) in fluid communication with both the UO and the DO, and the SC includes a sensing orifice. The pressure sensor is disposed to sense fluid pressure at the sensing orifice of the SC.

In any of the aspects or embodiments described above and herein, the second conduit has a second conduit inner diameter, the UO has an UO inner diameter, and the SC has a SC inner diameter, and the UO inner diameter may be less than both the second conduit inner diameter and the SC inner diameter.

In any of the aspects or embodiments described above and herein, the third conduit has a third conduit inner diameter, and the DO has a DO inner diameter. The DO inner diameter may be less than both the third conduit inner diameter and the SC inner diameter.

In any of the aspects or embodiments described above and herein, the UO has a UO axial length, and the UO axial length may be in the range of about two to three times the UO inner diameter.

In any of the aspects or embodiments described above and herein, the SC has a SC inner diameter and a SC axial length, and the SC axial length may be in the range of one SC inner diameter to three SC inner diameters.

In any of the aspects or embodiments described above and herein, the sensing orifice of the SC has a diameter that may be less than about twenty-five percent of the SC axial length.

In any of the aspects or embodiments described above and herein, the DO has a DO axial length, and the DO axial length may be in the range of about two to ten times the DO inner diameter.

In any of the aspects or embodiments described above and herein, the UO and the DO may be in line with one another.

In any of the aspects or embodiments described above and herein, the UO has a UO inner diameter and the DO has a DO inner diameter, and a ratio of the DO inner diameter to the UO inner diameter may be in the range of about 1.000 to about 1.150.

According to an aspect of the present disclosure, a method of controlling fluid flow in a fluid supply system having a fluid pump configured to receive a fluid from a first conduit disposed upstream of the fluid pump and to discharge fluid into a second conduit downstream of the fluid pump, a pressure sensor configured to produce signals representative of a sensed fluid pressure, and a pressure relief valve (PRV) having an inlet and an outlet and a fluid passage therethrough, wherein the PRV is controllable to be in a closed configuration, or a fully open configuration, or a plurality of partially open configurations, wherein the PRV is in signal communication with the pressure sensor, the method comprising: a) providing a fluid monitoring device having an upstream orifice (UO) in fluid communication with the second conduit, a downstream orifice (DO) in fluid communication with a third conduit, and a sensing chamber (SC) in fluid communication with both the UO and the DO, wherein the SC includes a sensing orifice; b) using the pressure sensor to sense fluid pressure at the sensing orifice of the SC and to produce the signals representative of the sensed fluid pressure; and c) using the signals representative of the sensed fluid pressure to control the PRV.

In any of the aspects or embodiments described above and herein, the fluid monitoring device may be configured to operate in a lead domain, and may have a ratio of the DO inner diameter to the UO inner diameter in the range of about 1.000 to about 1.100.

In any of the aspects or embodiments described above and herein, the fluid monitoring device may be configured to operate in a lag domain, and may have a ratio of the DO inner diameter to the UO inner diameter in the range of about 1.100 to about 1.150.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is configured for use in liquid fluid supply systems. Examples of fluid types with which the present disclosure may be used include, but are not limited to, hydraulic fluid, fuel, oil, and water. Liquid fluid supply systems typically include a pressure pump provided with a pressure regulating valve (PRV) that is disposed to receive a flow of fluid bled off of the primary fluid flow passing to the pump ("PRV bleed flow"). Piping extends from the outlet of the PRV back to the primary flow exiting the pump, downstream of the pump. Whatever PRV bleed flow passes through the PRV reenters the primary fluid flow downstream of the pump. The PRV is in signal communication with a pressure sensor ("PRV pressure sensor") that is disposed downstream of the pump. The PRV is intended to operate in a manner that causes fluid flow demand to match fluid flow delivery. The term "pipe" or "piping" as used herein is intended to be a generic term meaning a fluid conduit operable to contain a fluid flow therethrough. The terms "upstream" and "downstream" are used herein to describe positioning based on fluid flow direction; e.g., if fluid flow encounters component A prior to encountering component B, then component B is downstream of component A, and component A is upstream of component B.

Figure 1:
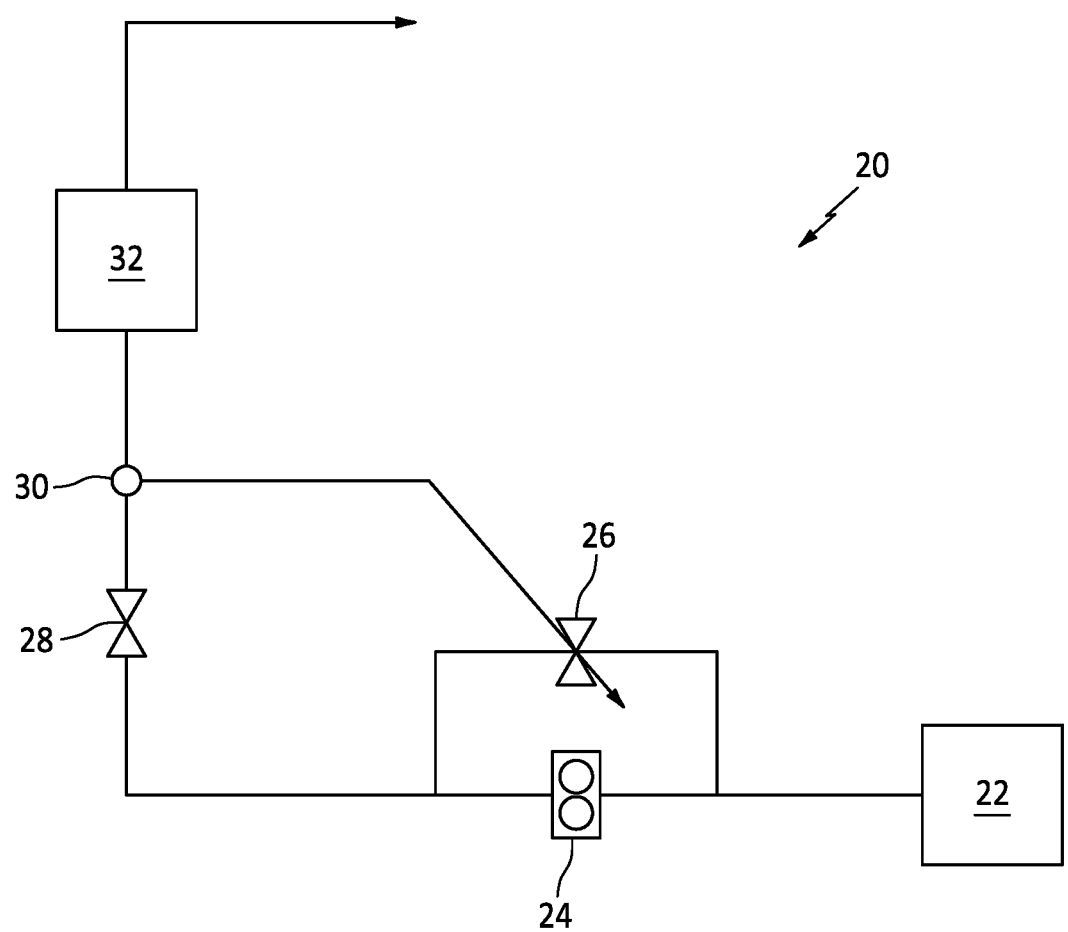
FIG. 1 is a schematic representation of a fluid flow system embodiment.

FIG. 1 is a diagrammatic representation of a fluid supply system 20 that includes a fluid tank 22, a fluid pump 24, a PRV 26 connected across the fluid pump 24, a flow restrictor 28, a PRV pressure sensor 30, and a fluid heat exchanger 32. The heat exchanger 32 represents a device containing a volume of fluid, and the present disclosure is not limited to including a heat exchanger 32. In a steady state mode, the fluid pump 24 delivers exactly the amount of fluid required by the heat exchanger 32 and the fluid is discharged from the heat exchanger 32 at a heat exchanger 32 internal constant pressure. The PRV pressure sensor 30 is disposed to sense the fluid pressure upstream of the heat exchanger 32. The PRV 26 and PRV pressure sensor 30 are intended to facilitate maintaining fluid flow rate in a steady state mode. The fluid supply system 20 is shown including a heat exchanger 32 as an example of a system component that contains fluid within the fluid supply system 20. Present disclosure embodiments may include a component configured to contain a volume of fluid other than a heat exchanger 32.

Pressure oscillations are a common occurrence in such a system 20 and may have multiple causes. In some cases, pressure oscillations may be caused by the PRV 26 "hunting" and can reach destructive levels. A small change in pump 24 speed that increases the inlet fluid flow rate into the heat exchanger 32 by an amount (Δ fluid flow) may shift the system 20 out of a steady state mode. More specifically, the change in fluid flow rate may cause the fluid pressure in the heat exchanger 32 to increase at a rate that is proportional to the change in fluid flow rate. Depending on the location of the PRV pressure sensor 30 providing data to the PRV 26, the pressure sensor 30 may initially report no change in pressure to the PRV 26, or in some cases the pressure sensor 30 may report a small drop in fluid pressure. If the pressure sensor data indicates no change in pressure to the PRV 26, there is no impetus for the PRV 26 to act, or if the pressure sensor data indicates a slight drop in pressure to the PRV 26, then the PRV 26 may act in response to that slight pressure drop and begin moving in a closing direction. If the PRV 26 does begin to close, then the rate of fluid flow that is passed through the PRV 26 is decreased and the fluid flow that is passed through the pump is increased by an amount that would have otherwise passed through the PRV 26.

After some period of time with the increased fluid flow, the fluid pressure in the heat exchanger 32 will increase and a pressure wave will propagate upstream from the heat exchanger 32. Eventually, the PRV pressure sensor 30 will sense the increase in fluid pressure and produce signals representative of the same to the PRV 26. In response, the PRV 26 will operate to address the increase in pressure/deviation from the steady state mode; e.g., the PRV 26 will reverse the closing movement to an opening movement, or move from its steady state configuration and begin movement towards a more open configuration. This PRV 26 operation is, however, delayed by some amount of time from the action that created the increase in pressure; i.e., the increase in fluid flow from fluid pump 24. Very often, the delayed PRV 26 reaction based on the PRV pressure sensor 30 signals results in the PRV 26 overreacting (i.e., "overshooting"). The fluid flow adjustment process may then reverse in response to the overshoot. This pressure oscillation (and the related opening/closing movement of the PRV 26) may dampen or may amplify indefinitely, the condition being dependent on a whole set of parameters defining the system dynamic characteristics. In the theory of feedback control the condition is often referred to as a "loss of phase margin"; i.e., the feedback correction action is belated and fails to compensate the error.

Figure 2:
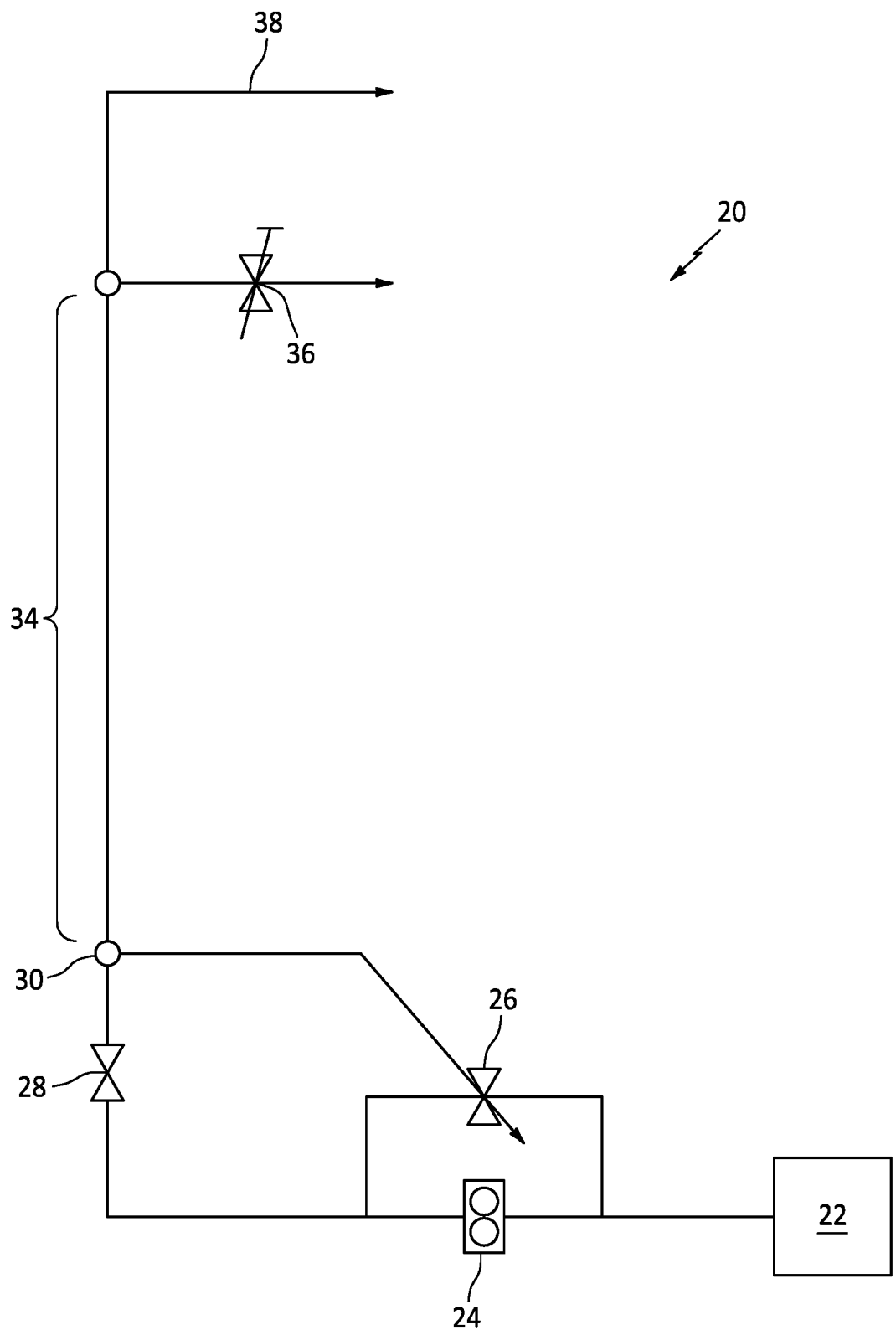
FIG. 2 is a schematic representation of a fluid flow system embodiment.

FIG. 2 is a diagrammatic representation of a fluid supply system 20 that includes a fluid tank 22, a fluid pump 24, a PRV 26 connected across the fluid pump 24, a flow restrictor 28, a PRV pressure sensor 30, a long piping section 34, a distribution valve 36 connected to the long piping section 34, and an open branch 38 connected to the long piping section 34. A piping section may be considered "long" when the length of the pipe is about twenty-five percent (25%) or longer than the expected pressure wave wavelength at the frequency to be transported by the pipe, also taking into account the fluid properties (e.g., $L >= C/f*0.25$, where $C = sqrt(bulk modulus of the fluid/density of the fluid)$. The PRV pressure sensor 30 is disposed to sense the fluid pressure upstream of the long piping section 34. The PRV 26 and PRV pressure sensor 30 are intended to operate in a manner that maintains the required fluid flow rate in a steady state mode.

During operation of the system 20 shown in FIG. 2, a transient condition may develop, for example, when the fluid pump 24 accelerates. The fluid pump 24 acceleration results in an increased fluid flow rate through the pump 24. However, fluid disposed in the long piping section 34 will impede the fluid flow rate increase due to fluid inertia. As a result, a back propagating pressure wave may develop that will be sensed by the PRV pressure sensor 30, and the PRV 26 may be controlled to move in an opening direction based on the PRV pressure sensor 30 signals. Once the fluid accelerates in the long piping section 34, however, the fluid pressure will drop at the PRV pressure sensor 30 and will continue to drop when the distribution valve 36 opens. The PRV pressure sensor 30 will then sense the fluid pressure drop and will produce signals that cause the PRV 26 to reverse; i.e., to change from moving in an opening direction to a moving in a closing direction. The described process may result in the PRV 26 "hunting" without converging to a steady state position.

Embodiments of the present disclosure are configured to decrease the potential for a liquid fluid supply system 20 to transition from a steady-state operating mode to a non-steady state operating mode, and/or to decrease the amount of time it takes for a liquid fluid supply system 20 in a non-steady state mode to transition to a steady state mode.

Figure 3:
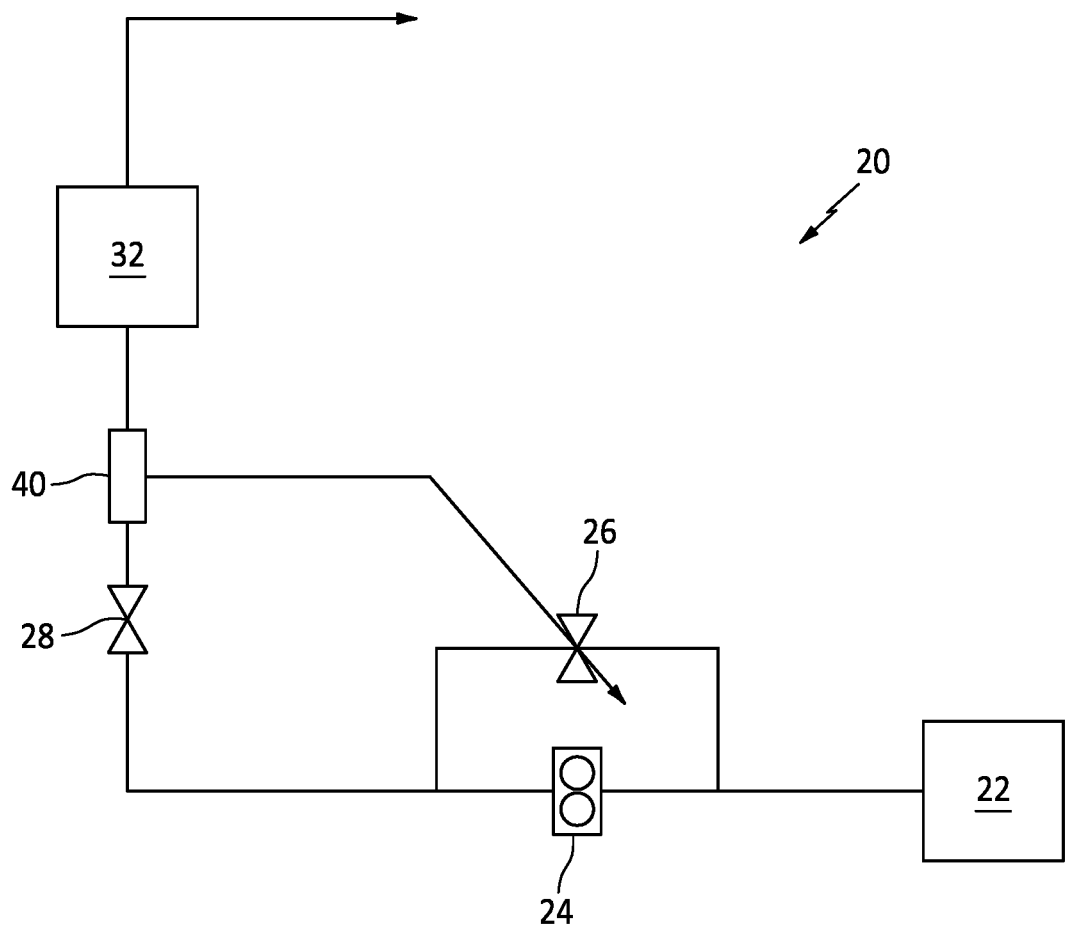
FIG. 3 is a schematic representation of a fluid flow system embodiment.

FIG. 3 is a nonlimiting example of a present disclosure fluid supply system 20 that includes a fluid flow monitoring device 40 that leverages a reverse proportionality between a variation in fluid flow rate within the system 20 and a sensed fluid pressure. The fluid supply system 20 may include a fluid tank 22, a fluid pump 24, a PRV 26 connected across the fluid pump 24, a flow restrictor 28, and a fluid flow monitoring device 40 that either includes a PRV pressure sensor 30 or is in communication with a PRV pressure sensor 30. The fluid supply system 20 is shown including a heat exchanger 32 as an example of a system component that contains fluid within the fluid supply system 20. Present disclosure embodiments are not limited to including a heat exchanger 32 or any other fluid system component unless indicated otherwise herein. The PRV 26 is a device having a fluid passage that can be controlled to vary between a closed configuration (fluid passage gate is closed to prevent fluid passing through the fluid passage) to a completely open position (fluid passage gate is open to its maximum). The PRV 26 may be controlled to a variety of different flow configurations between closed and fully open; e.g., 25% open, 50% open, 75% open, and the like. Control of the PRV 26 to achieve the desired degree of open/closed may be directly or indirectly based on an input signal produced by the PRV pressure sensor 30.

Figure 4:
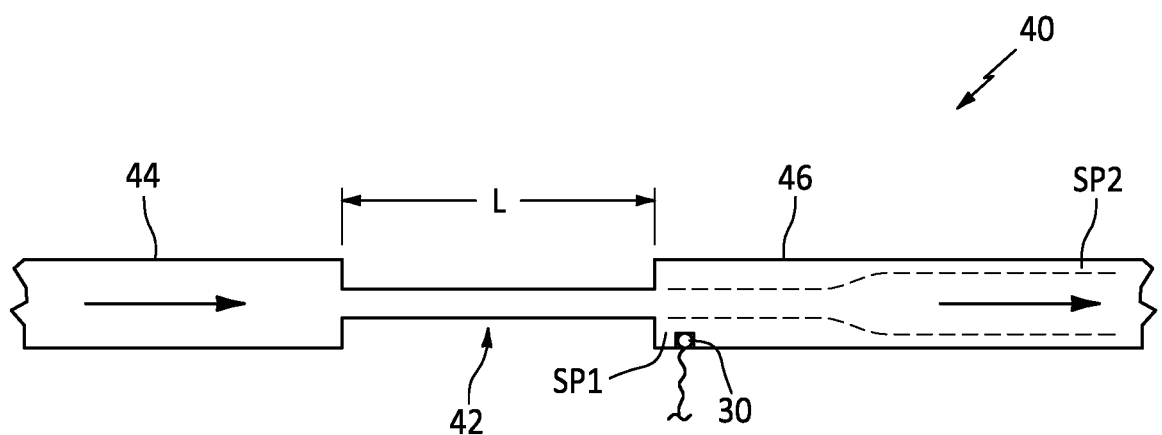
FIG. 4 is a diagrammatic representation of a fluid flow monitoring device.

FIG. 4 is a diagrammatic illustration of the fluid flow monitoring device 40 that may be used in a fluid supply system 20 like that shown in FIG. 3. The fluid flow monitoring device 40 includes a control orifice 42 in fluid communication with a first section of piping 44 from the fluid pump 24 disposed upstream of the control orifice 42 and a second section of piping 46 disposed downstream of the control orifice 42. The control orifice 42 may be an orifice or other flow contraction configuration. The control orifice diameter may be less than the diameter of the first or second sections of piping 44, 46. Preferably, the control orifice diameter is half or less than the diameter of the upstream first section of pipe, and the downstream pipe diameter is about twice or more the control orifice diameter. The control orifice 42 diagrammatically shown in FIG. 4 has an axial length "L". In some embodiments, the axial length may be chosen so as to be long enough for the fluid flow entering the device 40 to become sufficiently axially organized (e.g., substantially more laminar than turbulent) within the control orifice 42 to cause the fluid flow exiting the control orifice 42 to travel a distance within the second section of piping 46 before substantially diffusing. The control orifice 42 length over diameter ("L/D") may be less than one (i.e. L/D<1) or greater. Preferably, the L/D is >2. A PRV pressure sensor 30 is disposed to sense fluid flow within the second section of piping 46 in close proximity to the junction between the control orifice 42 and the second section of piping 46; i.e., in the substantially undiffused region. The fluid flow monitoring device 40 may be configured to include the PRV pressure sensor 30 or may be configured to receive a PRV pressure sensor 30 that is independent of the fluid flow monitoring device 40.

During operation of the fluid flow system 20, fluid flow exiting the control orifice 42 of the fluid flow monitoring device 40 in close proximity to the junction between the control orifice 42 and the second section of piping 46 will form a fluid zone that has a static pressure SP1. The same fluid flow traveling further axially through the second section of piping 46 (away from the control orifice 42) will diffuse and will increase in static pressure (labeled as SP2), such that SP2>SP1. During a transient fluid flow condition (e.g., an increase in fluid flow rate from the pump 24), the static pressure SP1 in close proximity to the junction between the control orifice 42 and the second section of piping 46 will decrease until the downstream static pressure SP2 increases (e.g., at a downstream component such as a heat exchanger). In fact, the static pressure SP1 is inversely related to the fluid flow rate through the fluid flow monitoring device 40; i.e., as the fluid flow rate through the control orifice 42 increases, the static pressure SP1 decreases. This inverse relationship may be referred to as a "reverse proportionality" between fluid flow rate variation and the pressure sensed by the PRV pressure sensor 30. This embodiment of the present disclosure leverages this fluid flow characteristic to provide signal information to the PRV 26 rapidly and as a result, the potential for a PRV 26 to overshoot and "hunt" is diminished and the ability to control fluid flow through the system 20 in a steady state manner is enhanced.

Figure 5:
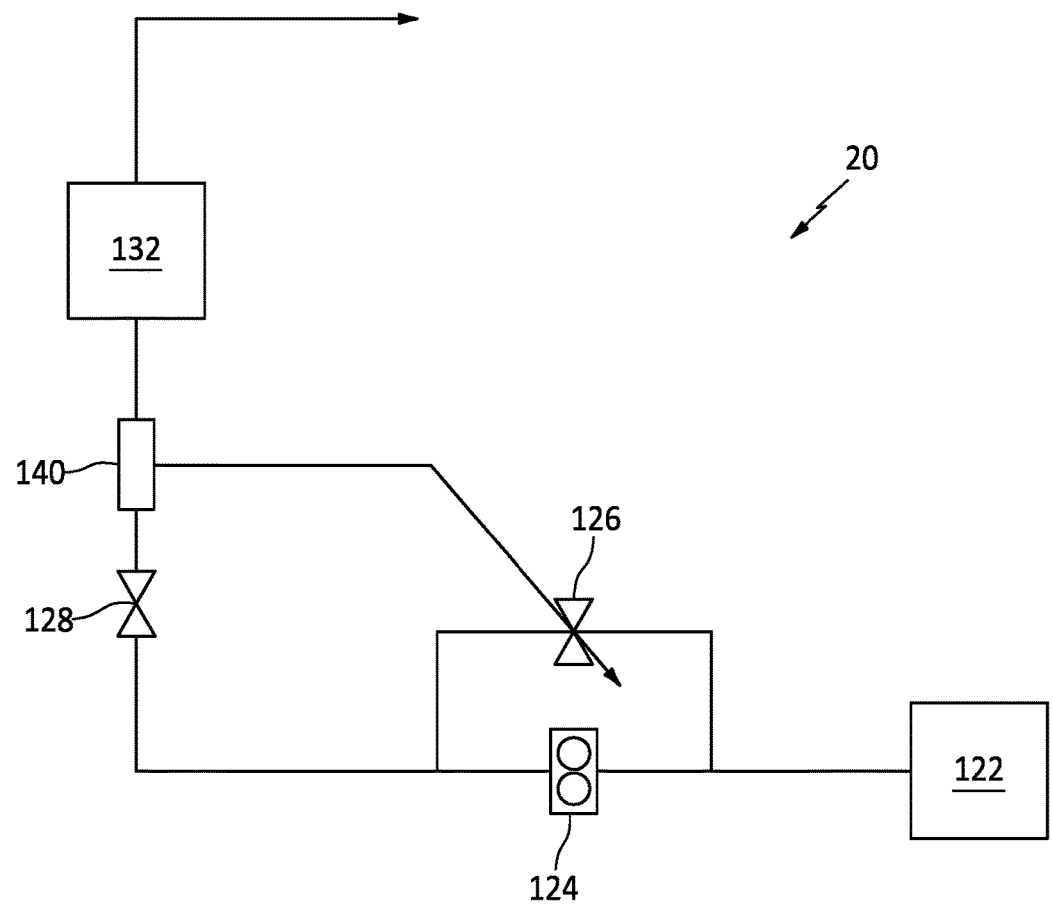
FIG. 5 is a schematic representation of a fluid flow system embodiment.
Figure 6:
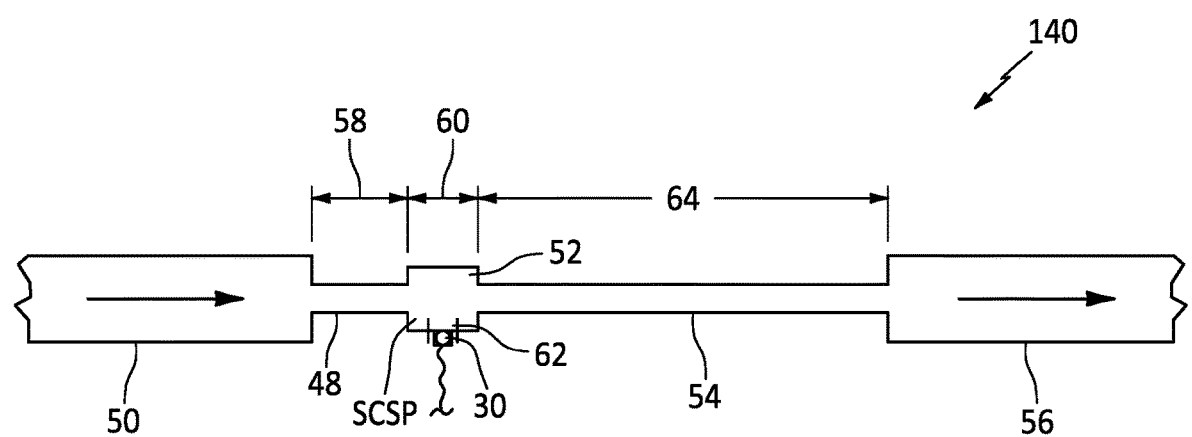
FIG. 6 is a diagrammatic representation of a fluid flow monitoring device.
Figure 7:
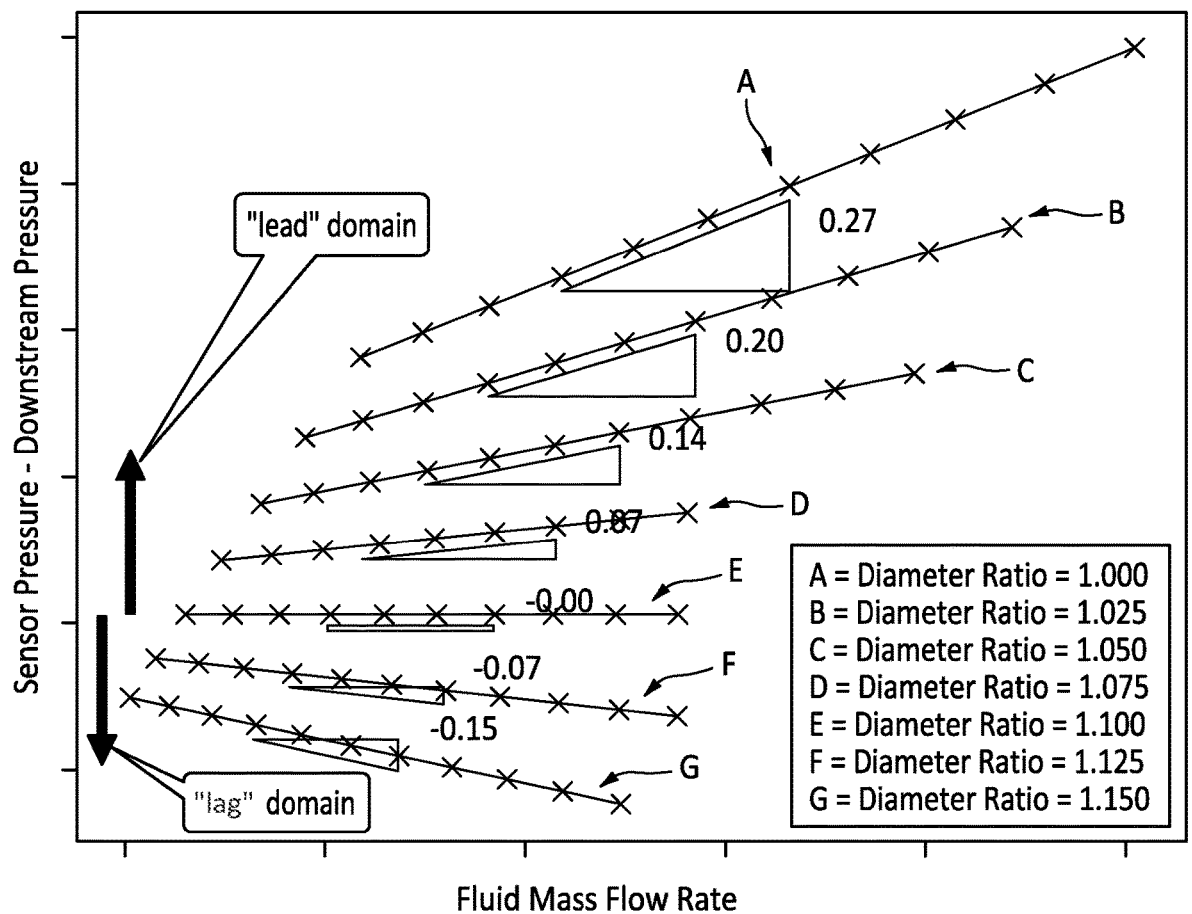
FIG. 7 is a graph of pressure difference as a function of the fluid flow rate, including a plurality of different data lines for different diameter ratios.

FIG. 5 is another nonlimiting example of a present disclosure fluid supply system 20 that includes a fluid tank 122, a fluid pump 124, a PRV 126 connected across the fluid pump 124, a flow restrictor 128, a fluid flow monitoring device 140, and a heat exchanger 132. The fluid flow monitoring device 140 either includes a PRV pressure sensor 30 or is in communication with a PRV pressure sensor 30 (see FIG. 6). The fluid flow monitoring device 140 embodiment diagrammatically shown in FIG. 6 includes an upstream orifice 48 in fluid communication with an upstream section of piping 50 from the pump 24, a sensing chamber 52, and a downstream orifice 54 in fluid communication with a downstream section of piping 56. The upstream orifice 48, sensing chamber 52, and downstream orifice 54 are in fluid communication with one another; e.g., fluid flows from the upstream section of piping 50, through upstream orifice 48, then through the sensing chamber 52, then through the downstream orifice 54, and enters the downstream section of piping 56. The upstream orifice 48 has an axial length 58 and an upstream orifice diameter. The upstream orifice axial length 58 may be about two to three times the upstream orifice diameter. The sensing chamber 52 has an inner diameter, an axial length 60, and a sensing orifice 62 having a sensing orifice diameter. The sensing chamber inner diameter may be at least twice the upstream orifice diameter. The sensing chamber axial length 60 may be in the range of about its own inner diameter up to about three times its inner diameter. The sensing chamber sensing orifice diameter is less than about twenty-five percent (25%) the axial length 60 of the sensing chamber 52. The sensing orifice diameter is in communication with the PRV pressure sensor 30. The downstream orifice 54 has an axial length 64 and a downstream orifice diameter. The downstream orifice 54 is in line with the upstream orifice 48. The downstream orifice axial length 64 is in the range of about two times the downstream orifice diameter to about ten times the downstream orifice diameter. The upstream section of piping 50 and the downstream section of piping 56 each have an inner diameter, although not necessarily the same inner diameter. The upstream orifice diameter may be less than the upstream section of piping 50 inner diameter and/or the downstream section of piping 56 inner diameter. The terms "upstream orifice diameter", "sensing chamber inner diameter", and "downstream orifice diameter" all refer to the inner diameter of the respective element that defines the flow passage therethrough. As shown in FIG. 7, the ratio of downstream orifice inner diameter to upstream orifice inner diameter (detailed below) is typically in the range of about 1.000 to about 1.150.

The present disclosure is not limited to the fluid flow monitoring device 140 dimensional parameters provided above. In preferred embodiments of this fluid flow monitoring device 140, the elements of the monitoring device 140 (i.e., upstream orifice 48, sensing chamber 52, and downstream orifice 54) are configured such that the basic resonant frequency of the device 140 is readily distinguishable from (e.g., at a higher frequency) than any source of excitation frequency present in the system (e.g., pump ripples). In this monitoring device 140 configuration, the sensing chamber 52 may be described in mechanical terms as functioning like a spring, wherein the fluid within the upstream orifice and the downstream orifice act as masses (with attendant inertia) acting on the "spring". When viewed in this manner, the internal geometry of the sensing chamber 52 (i.e., the internal volume) may include any geometry that permits the sensing chamber 52 to function as a spring. The dimensions of the monitoring device elements (i.e., upstream orifice 48, sensing chamber 52, and downstream orifice 54) provided above represent a nonlimiting example of a fluid flow monitoring device 140.

This fluid flow monitoring device 40 embodiment may be configured in a lag mode configuration or in a lead mode configuration. The structural distinction between the lag and lead mode configurations relates to the upstream orifice diameter and the downstream orifice diameter, or a ratio of the two.

$$\frac{\text{Downstream Orifice Diameter}}{\text{Upstream Orifice Diameter}} = \text{Diameter Ratio}$$

Alternatively, the relationship between the upstream orifice diameter and the downstream orifice diameter may be expressed as a ratio of cross-sectional areas; i.e., upstream orifice cross-sectional area and downstream orifice cross-sectional area.

FIG. 7 is a graph of pressure difference between the sensing chamber static pressure (SCSP) and the system downstream static pressure (vertical axis) as a function of the fluid flow rate (horizontal axis). The system downstream static pressure for the data shown in FIG. 7 is assumed to be a fixed value for FIG. 7, for example, at a heat exchanger 32 (or other component having a volume of fluid) disposed within the system upstream of the fluid flow monitoring device 40. Each of the data lines A-G within FIG. 7 represents a particular Diameter Ratio; e.g., data line A has a Diameter Ratio of 1.000 indicating that the downstream orifice diameter is equal to the upstream orifice diameter. The remainder of the data lines represent instances wherein the downstream orifice diameter is greater than the upstream orifice diameter, as indicated by a Diameter Ratio greater than one. The data lines in FIG. 7 also include data lines having a positive slope (i.e., data lines A-D; "lead domain") and data lines having a negative slope (i.e., data lines E-G; "lag domain").

As can be seen from FIG. 7 and discussed above, a change in the fluid flow rate (e.g., an increase) will result in a change in the pressure difference between the sensing chamber static pressure and the system downstream static pressure. The amount of change in the pressure difference between the sensing chamber static pressure (SCSP) and the system downstream static pressure varies as a function of the Diameter Ratios. In some instances (i.e., data lines A-D; "lead domain"), the magnitude of the aforesaid pressure difference increases as the fluid flow rate increase. As will be described below, embodiments of the fluid flow monitoring device 140 may be configured to operate in the lead domain. In other instances (i.e., data lines E-G; "lag domain"), the magnitude of the aforesaid pressure difference decreases as the fluid flow rate increases. As will be described below, embodiments of the fluid flow monitoring device 140 may be configured to operate in the lag domain.

In those embodiments wherein the fluid flow monitoring device 140 is configured to operate in the lead domain (e.g., Diameter Ratios above about 1.100), an increase in fluid flow rate will result in an increase in sensor chamber static pressure (SPC) and therefore an increase in the pressure difference between the sensing chamber static pressure (SCSP) and the system downstream static pressure. The increase in the pressure difference between the sensing chamber static pressure (SCSP) and the system downstream static pressure will continue until the system downstream pressure has adjusted and the system returns to a steady state mode.

During operation, the increase in sensor chamber static pressure (SCSP) caused by the increase in fluid flow rate will be rapidly sensed by the PRV pressure sensor 30 sensing at the sensing orifice of the sensing chamber 52. Because the increase in sensor chamber static pressure (SCSP) precedes any change in the system downstream static pressure by some amount of time, the change in sensor chamber static pressure (SCSP) may be viewed as "anticipating" any change in system downstream static pressure that would normally occur absent some corrective action by the PRV 26. Signals produced by the PRV pressure sensor 30 representative of the change in sensor chamber static pressure (SCSP) are sent to the PRV 26, which in turn may be controlled to take corrective action (e.g., begin an opening movement) in response thereto for the purpose of maintaining or returning the system to steady state mode and thereby maintaining a constant system downstream static pressure (e.g., in the heat exchanger 32). In this manner, the fluid flow monitoring device 40 permits the system 20 to react more rapidly to the increase in the fluid flow rate (i.e., increase in pump speed) and thereby mitigates the potential for the PRV 26 to overshoot and "hunt" and enhances the ability of the fluid flow system 20 to operate in a steady state mode at the increased fluid flow rate.

In those embodiments wherein the fluid flow monitoring device 140 is configured to operate in the lag domain (e.g., Diameter Ratios at or below about 1.100), an increase in fluid flow rate will result in a decrease in sensor chamber static pressure (SCSP) and therefore a decrease in the pressure difference between the sensing chamber static pressure (SCSP) and the system downstream static pressure. The decrease in the pressure difference between the sensing chamber static pressure (SCSP) and the system downstream static pressure will continue until the system downstream pressure has adjusted and the system returns to a steady state mode. Operating in a lag domain may help avoiding undesirable pressure oscillations and PRV "hunting" between valve 26 and valve 36 as per FIG. 2.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed:

1. A fluid supply system, comprising
a fluid pump configured to receive a fluid from a first conduit disposed upstream of the fluid pump and to discharge fluid into a second conduit downstream of the fluid pump;
a pressure sensor configured to produce signals representative of a sensed fluid pressure;
a pressure relief valve (PRV) having an inlet and an outlet and a fluid passage therethrough, wherein the PRV is controllable to be in a closed configuration, or a fully open configuration, or a plurality of partially open configurations, wherein the PRV is in signal communication with the pressure sensor; and
a fluid monitoring device having a control orifice in fluid communication with the second conduit disposed upstream of the control orifice and a third conduit disposed downstream of the control orifice, wherein the second conduit has a first inner diameter, the third conduit has a second inner diameter, and the control orifice has an orifice inner diameter, and the orifice inner diameter is less than both the first inner diameter and the second inner diameter;

wherein the pressure sensor is disposed to sense fluid pressure in the third conduit at a position downstream of the control orifice in close proximity to the control orifice.

2. The fluid supply system of claim 1, wherein the control orifice inner diameter is no greater than half the first inner diameter.

3. The fluid supply system of claim 1, wherein the second inner diameter is at least twice the control orifice inner diameter.

4. The fluid supply system of claim 1, wherein the control orifice has an axial length, and an axial length over control orifice inner diameter ratio that is less than one.

5. The fluid supply system of claim 1, wherein the control orifice has an axial length, and an axial length over control orifice inner diameter ratio that is at least two.

6. A fluid supply system, comprising:
a fluid pump configured to receive a fluid from a first conduit disposed upstream of the fluid pump and to discharge fluid into a second conduit downstream of the fluid pump;
a pressure sensor configured to produce signals representative of a sensed fluid pressure;
a pressure relief valve (PRV) having an inlet and an outlet and a fluid passage therethrough, wherein the PRV is controllable to be in a closed configuration, or a fully open configuration, or a plurality of partially open configurations, wherein the PRV is in signal communication with the pressure sensor; and
a fluid monitoring device having an upstream orifice (UO) in fluid communication with the second conduit, a downstream orifice (DO) in fluid communication with a third conduit, and a sensing chamber (SC) in fluid communication with both the UO and the DO, wherein the SC includes a sensing orifice;
wherein the pressure sensor is disposed to sense fluid pressure at the sensing orifice of the SC.

7. The fluid supply system of claim 6, wherein the second conduit has a second conduit inner diameter, the UO has an UO inner diameter, and the SC has a SC inner diameter;
wherein the UO inner diameter is less than both the second conduit inner diameter and the SC inner diameter.

8. The fluid supply system of claim 7, wherein the third conduit has a third conduit inner diameter, and the DO has a DO inner diameter;
wherein the DO inner diameter is less than both the third conduit inner diameter and the SC inner diameter.

9. The fluid supply system of claim 6, wherein the UO has a UO axial length, and the UO axial length is in the range of about two to three times the UO inner diameter.

10. The fluid supply system of claim 6, wherein the SC has a SC inner diameter and a SC axial length, and the SC axial length is in the range of one SC inner diameter to three SC inner diameters.

11. The fluid supply system of claim 6, wherein the sensing orifice of the SC has a diameter that is less than about twenty-five percent of the SC axial length.

12. The fluid supply system of claim 6, wherein the DO has a DO axial length, and the DO axial length is in the range of about two to ten times the DO inner diameter.

13. The fluid supply system of claim 6, wherein the UO and the DO are in line with one another.

14. The fluid supply system of claim 6, wherein the UO has a UO inner diameter and the DO has a DO inner diameter, and a ratio of the DO inner diameter to the UO inner diameter is in the range of about 1.000 to about 1.150.

15. A method of controlling fluid flow in a fluid supply system having a fluid pump configured to receive a fluid from a first conduit disposed upstream of the fluid pump and to discharge fluid into a second conduit downstream of the fluid pump, a pressure sensor configured to produce signals representative of a sensed fluid pressure, and a pressure relief valve (PRV) having an inlet and an outlet and a fluid passage therethrough, wherein the PRV is controllable to be in a closed configuration, or a fully open configuration, or a plurality of partially open configurations, wherein the PRV is in signal communication with the pressure sensor, the method comprising:
providing a fluid monitoring device having an upstream orifice (UO) in fluid communication with the second conduit, a downstream orifice (DO) in fluid communication with a third conduit, and a sensing chamber (SC) in fluid communication with both the UO and the DO, wherein the SC includes a sensing orifice;
using the pressure sensor to sense fluid pressure at the sensing orifice of the SC and to produce the signals representative of the sensed fluid pressure; and
using the signals representative of the sensed fluid pressure to control the PRV.

16. The method of claim 15, wherein the UO has a UO inner diameter and the DO has a DO inner diameter, and a ratio of the DO inner diameter to the UO inner diameter is in the range of about 1.000 to about 1.150.

17. The method of claim 16, wherein the fluid monitoring device is configured to operate in a lead domain.

18. The method of claim 17, wherein the ratio of the DO inner diameter to the UO inner diameter is in the range of about 1.000 to about 1.100.

19. The method of claim 16, wherein the fluid monitoring device is configured to operate in a lag domain.

20. The method of claim 19, wherein the ratio of the DO inner diameter to the UO inner diameter is in the range of about 1.100 to about 1.150.

* * * * *